Figure 1:
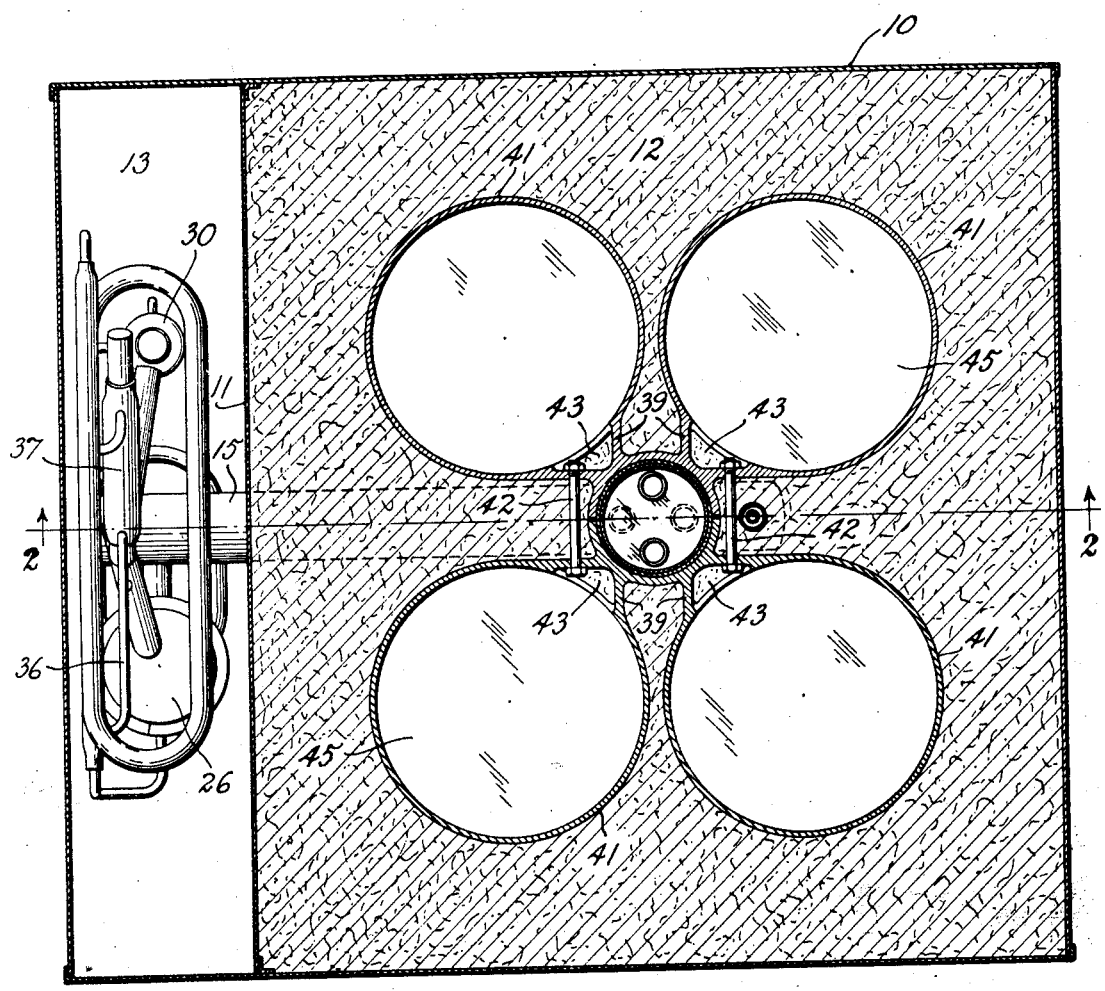

Nov. 20, 1928.  1,692,792

C. G. MUNTERS

CABINET FOR ICE CREAM AND THE LIKE

Filed Jan. 5, 1928  4 Sheets-Sheet 1

INVENTOR
Carl Georg Munters
BY
his ATTORNEY

Nov. 20, 1928.
C. G. MUNTERS
1,692,792
CABINET FOR ICE CREAM AND THE LIKE
Filed Jan. 5, 1928     4 Sheets-Sheet 2
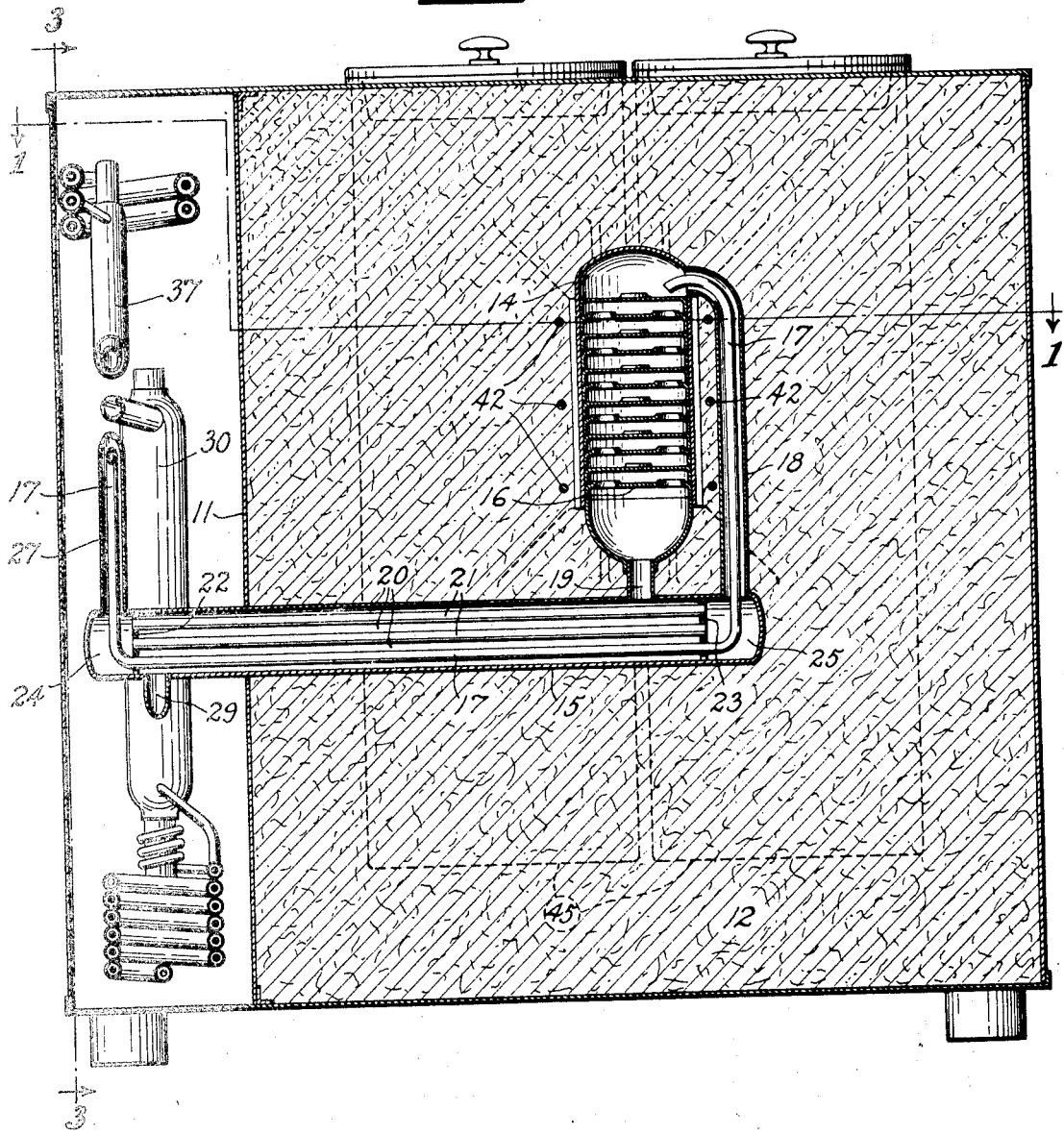
INVENTOR
Carl Georg Munters
BY
his ATTORNEY

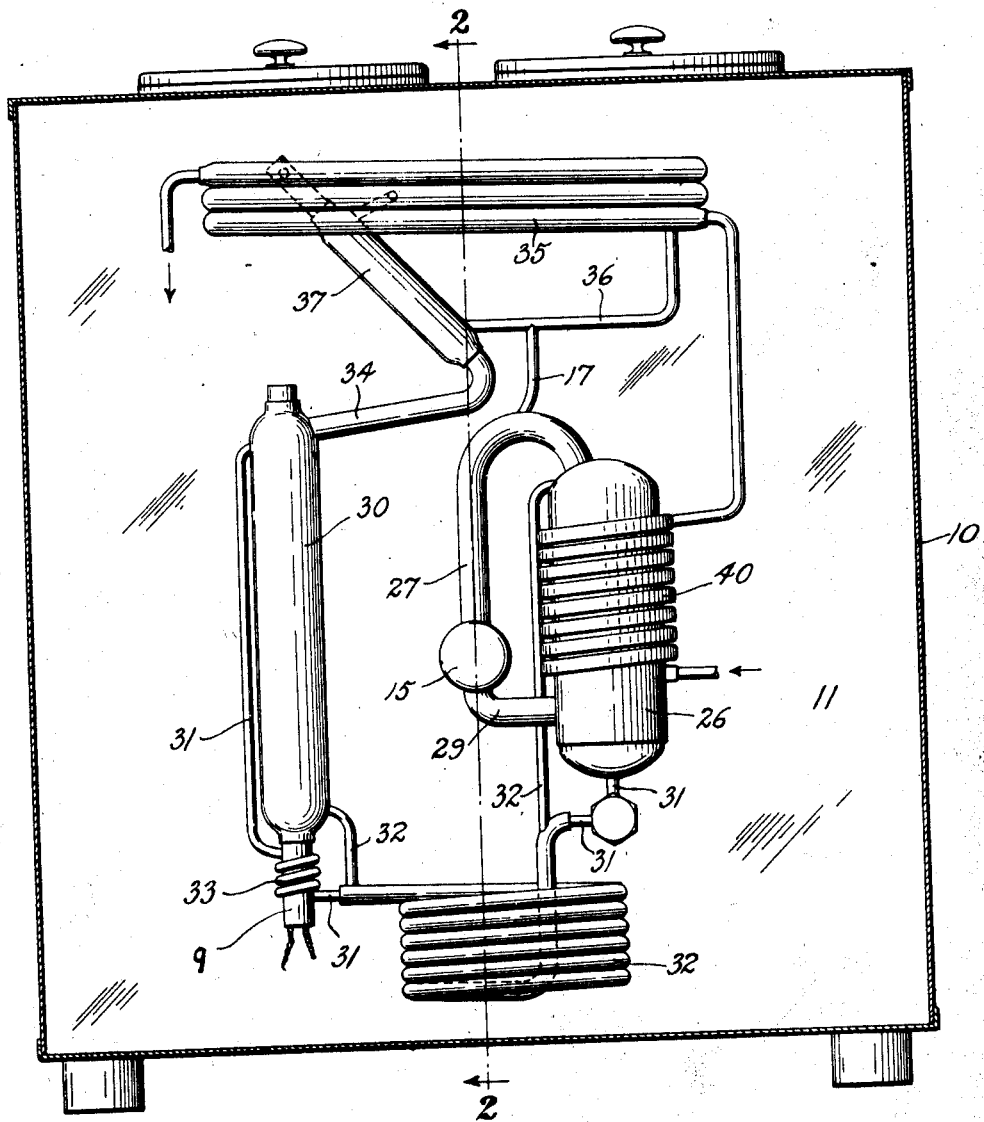

Nov. 20, 1928.  C. G. MUNTERS  1,692,792
CABINET FOR ICE CREAM AND THE LIKE
Filed Jan. 5, 1928   4 Sheets-Sheet 4
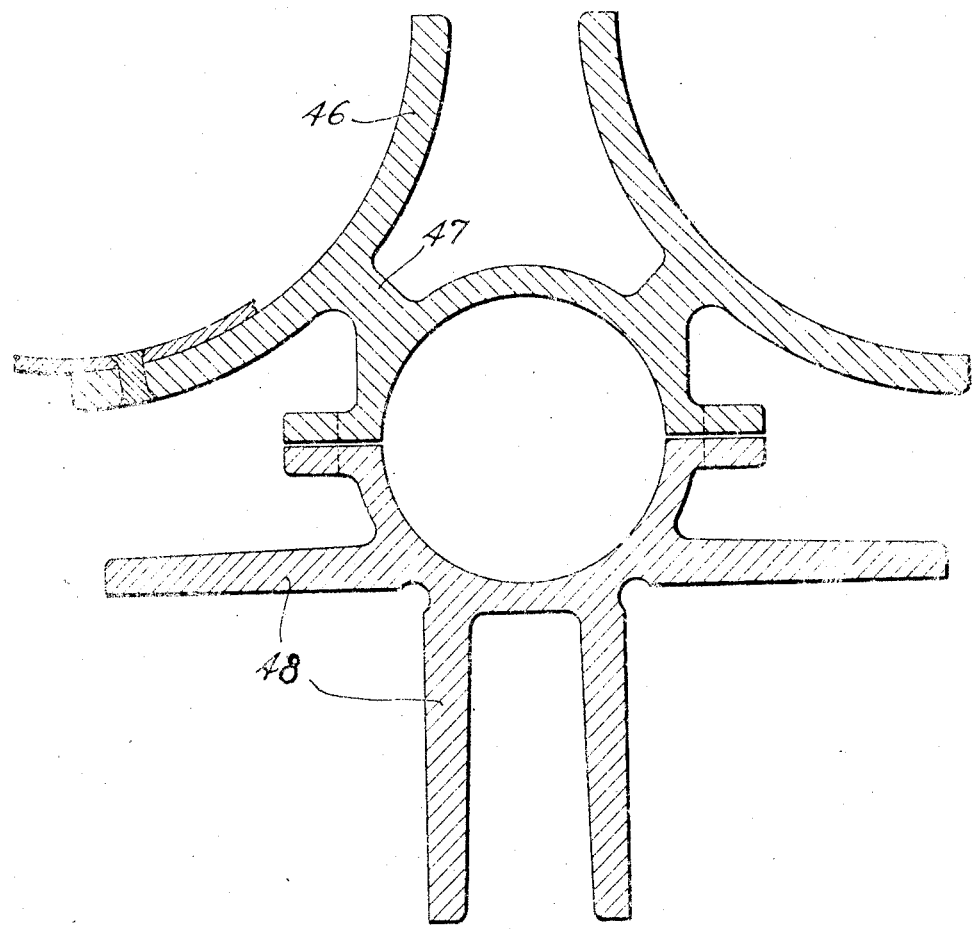
INVENTOR
Carl Georg Munters
BY
his ATTORNEY

Patented Nov. 20, 1928.

1,692,792

UNITED STATES PATENT OFFICE.

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE.

CABINET FOR ICE CREAM AND THE LIKE.

Application filed January 5, 1928, Serial No. 244,599, and in Germany January 22, 1927.

My invention relates to cabinets for ice cream cans, milk cans and the like. I aim to provide a unitary cabinet for such uses combining economy of space with efficiency of operation of artificial refrigeration apparatus. My invention involves several novel features as will be apparent from the following description taken in connection with the accompanying drawings showing several forms of my invention on which:

Fig. 1 is a cross-sectional view looking down on an ice cream cabinet built in accordance with my invention—Fig. 1 is taken on the line 1—1 of Fig. 2; Fig. 2 is an elevational cross-sectional view taken on the line 2—2 of Fig. 1; Fig. 3 is an elevational view taken on the line 3—3 of Fig. 2; Fig. 4 is a cross-sectional view of a modified casting member forming part of the ensemble of Fig. 1.

Referring more particularly to the arrangement shown in Figs. 1, 2 and 3, the cabinet comprises a box-like casing 10 having all rectangular sides. The casing 10 is divided by a partition 11 into a colder compartment 12 which is substantially square in horizontal cross-section as shown in Fig. 1 and a smaller apparatus compartment 13 to one side of the colder compartment.

Within compartment 12 and extending vertically along its vertical center line is a cylindrical steel evaporator shell 14. This steel shell contains a series of discs 16 and is like the evaporator shell shown in Patent No. 1,609,334 granted December 7, 1926, on the application of Baltzar Carl von Platen and myself jointly. The evaporator shell is supplied with a liquid refrigerant or cooling agent through conduit 17. It is supplied with an inert gas through conduit 18. In the evaporator the cooling agent, which may be ammonia, and the auxiliary agent or inert gas, which may be hydrogen, diffuse into each other and the changing of ammonia from liquid to gaseous state produces a state of cold which is transmitted to the product to be refrigerated in the manner presently to be described.

The mixture of ammonia and hydrogen formed in the evaporator passes out therefrom through conduit 19 and into a central space 20 between tubes 21 in the horizontally extending heat exchanger 15 which passes through the partition wall 11. The tubes 21 extend between two heads 22 and 23. The two heads form chambers 24 and 25 at the ends of the heat exchanger. The tubes and the chambers 24 and 25 are part of the passage for hydrogen which is introduced into the evaporator through conduit 18. The hydrogen passes out of the top of absorber 26 which is also supplied with discs and passes through conduit 27 to chamber 24. The mixture of gases passes into the absorber through conduit 29. In the heat exchanger the cold mixture of gases in space 20 cools the hydrogen passing through tubes 21 and the liquid ammonia passing through conduit 17.

A generator 30 is connected to the absorber by means of conduits 31 and 32. Conduit 31 passes inside conduit 32 to form a liquid heat exchanger. One end of conduit 31 is connected to the lower part of the absorber and the other end is connected to the upper part of the generator. The conduit is passed around a heating space 9 in the form of a coil 33 which serves to give a percolator action for circulating absorption liquid. Conduit 32 conveys weak liquor from the lower part of the generator to the upper part of the absorber. Vapor expelled from solution in the generator passes through conduit 34 and into condenser 35 where it is condensed and from which it passes into conduit 36 and thence through conduit 17 into the evaporator. A conduit 37 surrounding pipe 34 is connected with conduit 36 and is connected with the condenser at the top to form a rectifier.

Cooling water is supplied in series to cooling coil 40 surrounding the absorber and to the condenser 35.

A casting member 41 comprising four loops of cylindrical formation arranged on vertical axes is clamped around the steel evaporator shell 14. This casting is preferably made of aluminum or copper. It is made in two sections which are bolted together by means of bolts 42. Recesses 43 for the bolts are formed on the insides of the loops. The casting member has what might be termed a hub portion, the hub portion of each section being semicircular in formation. The loops are integral with the hub portion and extend outwardly therefrom being connected thereto by means of webs 39. The loops are adapted to receive cans containing ice cream or milk or the like. Bottoms for the loop containers 45 may be made integral with or separately from the loop cylinders.

By means of this arrangement the cold produced is readily transmitted to the ice cream cans; or in other words, heat is readily abstracted from the ice cream or other material in the containers. It will be noted that all heat transmission is directly through metal. The arrangement makes a compact unitary structure with equal heat transmission in all directions.

Fig. 4 shows a modified arrangement wherein the loops are not complete but extended arc-shaped members 46 are attached to vertical webs 47 and plates or containers forming the loops are riveted or otherwise secured to the arc-shaped members 46. If square cans or containers are used, the straight arms 48 may be used to which rectangular containers can be attached.

Outside the loops 41 the casing 10 is packed with insulation. Suitable covers are placed over the circular receptacles. If desired, the supply of heat may be controlled by a thermostat placed in the vicinity of the ice cream containers.

It will be noted that the loops are arranged symmetrically about the steel cylindrical evaporator shell which gives an even heat transmission.

Having thus described my invention, what I claim is:

1. A cabinet for ice cream cans, milk cans and the like comprising a casing, a centrally disposed vertically extending cylindrical evaporator shell, means to supply a cooling agent to said evaporator shell and to supply an auxiliary agent thereto in the presence of which the cooling agent evaporates, a plurality of superimposed apertured discs in said evaporator shell, a pair of castings, each casting having a generally semicircular hub portion and a plurality of loops integral therewith, means to clamp the castings around the evaporator shell, said loops being adapted for reception of ice cream cans, milk cans and the like, and insulation in the casing around the loops, the arrangement being such that when assembled the spaces within the loops extend vertically and the loops are substantially equally spaced around the evaporator shell.

2. A cabinet for ice cream cans, milk cans and the like comprising a casing, an evaporator shell in said casing, a casting member having a generally circular hub portion, means securing metallic contact between said evaporator shell and said hub portion, a plurality of webs extending from said hub portion and a plurality of curved members extending from said webs and adapted for forming enclosures.

3. Refrigerating apparatus including an evaporator comprising a vertically extending shell, a casting comprising a hub portion, said hub portion having metallic contact with said shell, a web extending from said hub portion and an arc-shaped member extending from said web.

4. Refrigerating apparatus comprising a casing, a vertically extending evaporator shell, disposed within said casing, a casting comprising a hub portion, said hub portion having metallic contact with said evaporator shell, a web extending from said hub portion and a curved member extending from said web.

5. Refrigerating apparatus comprising a casing, a vertically extending evaporator shell disposed within said casing, a casting comprising a hub portion, said hub portion having metallic contact with said evaporator shell, a web extending from said hub portion, an arc-shaped member extending from said web and heat-insulating material within said casing around said evaporator shell and said casting.

6. Refrigerating apparatus comprising a casing, a vertically extending evaporator shell disposed within said casing, a casting comprising a hub portion, said hub portion having metallic contact with said evaporator shell, a web extending from said hub portion, an arc-shaped member extending from said web, said arc-shaped member forming a closure for the reception of ice cream cans, milk cans and the like and heat-insulating material within said casing and surrounding said evaporator shell and said casting.

7. Refrigerating apparatus comprising a vertically extending evaporator shell, a casting comprising a hub portion, said hub portion having metallic contact with said evaporator shell, a web extending from said hub portion and an arc-shaped member extending from said web, said arc-shaped member forming a closure for the reception of ice cream cans, milk cans and the like.

In testimony whereof I hereunto affix my signature.

CARL GEORG MUNTERS.